Figure 1:
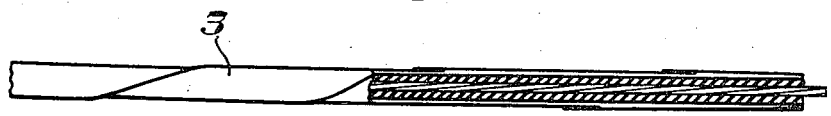

Aug. 26, 1947.  W. F. O. POLLETT  2,426,413
MANUFACTURE OF INSULATED ELECTRIC CONDUCTORS
Filed July 6, 1944

INVENTOR
William Francis Ogilvie Pollett

Patented Aug. 26, 1947

2,426,413

UNITED STATES PATENT OFFICE 2,426,413

MANUFACTURE OF INSULATED ELECTRIC CONDUCTORS

William Francis Ogilvie Pollett, Gravesend, England, assignor to W. T. Henley's Telegraph Works Company Limited, Dorking, England, a British company Application July 6, 1944, Serial No. 543,720
In Great Britain July 7, 1943

3 Claims. (Cl. 154—2.28)

This invention relates to the manufacture of an electric conductor enclosed in a covering comprising a layer of a polyvinyl compound and a textile layer outside the polyvinyl compound layer. By the term "polyvinyl compound" as used herein is meant polyvinyl chloride and the co-polymers of vinyl chloride and vinyl acetate containing up to 15% of the acetate, together with a plasticiser or plasticisers. The "polyvinyl compound" may also include stabilisers, lubricators and colouring matter. The textile covering may be a braid or may be a lapping of tape or of yarn.

With such an insulated conductor it is often desired to obtain bonding between the layer of polyvinyl compound and the textile covering. In similar coverings, in which the place of the polyvinyl compound is taken by rubber and vulcanisation is carried out after the textile covering has been applied, the rubber softens sufficiently during the early stages of vulcanisation for the textile covering to sink in and become firmly embedded, so that after cooling there is an effective bond between the two layers. Such a procedure is not effective for polyvinyl compound. Although heat treatment of the layer of this compound may be necessary in order to get it into its final condition and in this process some softening of the compound may occur, it is not generally practicable to effect sufficient softening to produce adequate bedding down of the textile for appreciable adhesion to result. This is because at the high temperature required to soften sufficiently polyvinyl compounds of the type normally used, decomposition of the polyvinyl ester and of the textile material (if this is of an organic character) will ensue.

By the present invention an improved process is provided by which effective bonding of the polyvinyl compound layer to the textile covering is obtained. In this process an additional material is employed as a bonding agent. This is a polyvinyl chloride composition in the form of a thin paste. It is applied to the external surface of the polyvinyl compound covering after this has been applied to the conductor. The paste is of such a consistency that it readily wets the surface of the polyvinyl compound covering, so that, on dipping followed by wiping, this surface is smeared with a thin layer. After this has been done the textile covering is applied in the usual way and then the covered conductor is subjected to a heat treatment by which effective bonding is obtained.

The paste used is a dispersion (substantially ungelled) of finely powdered polyvinyl chloride in a non-volatile plasticising liquid. A dispersion in the form of paste is obtained by a procedure in which heating up to the temperature at which gelling takes place is avoided during the whole of the mixing or during nearly the whole of the mixing, the excepted part being at the beginning of the mixing. The final heat treatment of the covered conductor is such as to raise the temperature of the paste above the gelling point, whereupon the paste gels to form the bond between the polyvinyl chloride compound and the textile covering. Paste of this kind is available on the market under the registered trade-mark "Welvic" being sold as Welvic Paste. A suitable paste may be made by dissolving one part by weight of polyvinyl chloride in 30 parts of tricresyl phosphate at a temperature of 110° C., cooling this solution to about 40° C. and stirring in further polyvinyl chloride at that temperature up to about 18 parts.

Figure 2:
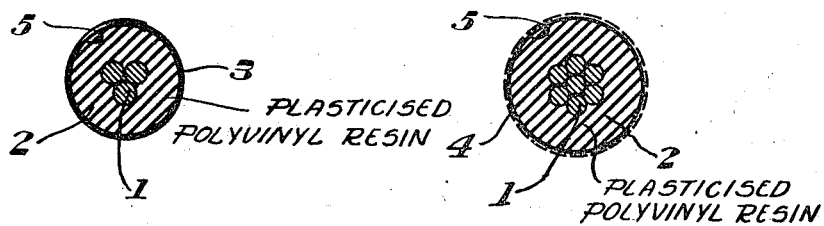
Figure 4:
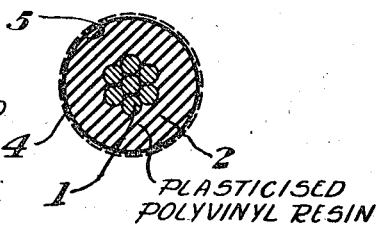
Figure 3:

Two examples of covered conductors manufactured in accordance with the invention are shown in the accompanying drawings. In these:

Figures 1 and 3 are longitudinal views partly in section of two different conductors; and Figures 2 and 4 are transverse sections on an enlarged scale of the conductors of Figures 1 and 3 respectively.

The conductor 1 in each case is covered by one or more layers of polyvinyl compound to provide the insulating covering 2. In the case of Figures 1 and 2 the textile covering is a helically lapped tape 3. In the case of Figures 3 and 4 the textile covering is a braid 4. Between the textile covering and the polyvinyl compound is a thin layer of bonding material 5 which has been applied as paste to the outer surface of the covering 2 and has penetrated to a greater or less extent into the interstices of the textile layer 3 or 4 while in the ungelled state so that, when gelling took place, a secure bond between the outer surface of the compound 2 and the inner surfaces of the textile layer 3 or 4 has been produced.

The carrying out of the manufacturing process consists in the application of the polyvinyl compound covering to the conductor (for instance by the longitudinal method, or by extrusion, or by lapping) followed by the wetting of the surface of this covering with the polyvinyl chloride paste (which may be done by brushing, or by drawing the covered conductor through the paste and wiping off the surplus) followed by the application of the textile covering and then the heating of the covered conductor so that the paste is raised to a temperature above the gelling point. This heating may also form part of another stage of the treatment of the covering; for instance, it may be a heat treatment which is necessary for the polyvinyl compound layer for the purpose of consolidating seams therein, or bonding separate plies of the material, or removal of stresses. Where the textile covering is to be coated, impregnated or otherwise treated with some hot material, such as wax, the dipping in this material may also serve to effect the heating of the paste.

In one example a conductor provided with a covering of polyvinyl chloride compound applied by the longitudinal method and having an outer covering of cotton braid, with the paste between them, was heated for seven seconds, while passing through a wax bath at 155° C., this treatment serving for improving and stabilizing the condition of the polyvinyl chloride compound covering, for gelling the paste and for applying the wax. In carrying out the longitudinal method, two long strips of thin, plasticized polyvinyl chloride compound sheet material are passed longitudinally between a pair of circumferentially grooved rolls with a group of parallel wires between them. The grooves in the rolls register with each other and form at the nip circular apertures, through each of which passes a wire with parts of the two strips, one forming the upper and the other the lower half of the covering of the wire. At each side of each groove the two strips are very forcibly compressed so that they are almost severed and at the same time seams are formed at each side of the wire between the upper strip and the lower strip by the forcible compression of the insulating material there. A number of pairs of grooved rolls may be arranged in a machine so that more than one ply of the covering may be applied during a single pass of the wires through the machine.

In another example a conductor covered with polyvinyl compound by the longitudinal method and then with a cotton braid, with paste between the surface of the polyvinyl compound layer and the braid, was heated for twelve seconds in air in an oven at 360° C. The heat treatment was thus applied simultaneously to the polyvinyl compound covering and to the paste.

What I claim as my invention is:

1. A method of manufacture of an insulated electric conductor, comprising applying to a conductor a covering of polyvinyl compound selected from the group consisting of polyvinyl chloride and the copolymers of vinyl chloride and vinyl acetate containing up to 15% of the acetate, together with a plasticizer, wetting the surface of this covering with a paste consisting of a substantially ungelled dispersion of powdered polyvinyl chloride in a non-volatile plasticising liquid, applying a textile covering to the wetted surface and then heating the covered conductor to a temperature above the gelling point of the paste, thereby bonding the textile material to the polyvinyl compound.

2. A method of manufacture of an insulated electric conductor, comprising applying to a conductor a covering of polyvinyl compound selected from the group consisting of polyvinyl chloride and the copolymers of vinyl chloride and vinyl acetate containing up to 15% of the acetate, together with a plasticizer, wetting the surface of this covering with a paste consisting of a substantially ungelled dispersion of powdered polyvinyl chloride in a non-volatile plasticising liquid, applying a textile covering to the wetted surface and then passing the covered conductor through a bath of hot material for coating, impregnating or otherwise treating the textile covering and at the same time raising the paste to a temperature above its gelling point, thereby bonding the textile material to the polyvinyl compound.

3. A method of manufacture of an insulated electric conductor, comprising passing two strips of polyvinyl compound selected from the group consisting of polyvinyl chloride and the copolymers of vinyl chloride and vinyl acetate containing up to 15% of the acetate, together with a plasticizer, longitudinally between a pair of circumferentially grooved rolls, with a group of parallel wires between them, thereby forming a plurality of conductors covered with said polyvinyl compound, wetting the surface of said polyvinyl compound covering with a paste consisting of a substantially ungelled dispersion of powdered polyvinyl chloride in a non-volatile plasticising liquid, applying a textile covering to the wetted surface and then heat-treating the covered conductor at a temperature at which the polyvinyl compound is softened and the paste is gelled, thereby consolidating the seams of the layer of polyvinyl compound and bonding the outer surface of the polyvinyl compound to the textile covering.

WILLIAM FRANCIS OGILVIE POLLETT.

REFERENCES CITED

The following references are of record in the file of this patent:

UNITED STATES PATENTS

| Number | Name | Date |
| --- | --- | --- |
| 1,893,590 | Mau | Jan. 10, 1933 |
| 1,198,350 | Heaney | Sept. 12, 1916 |
| 2,260,761 | Wilkoff | Oct. 28, 1941 |
| 2,269,877 | Johnson | Jan. 13, 1942 |
| 2,183,811 | Homan | Dec. 19, 1939 |
| 2,013,686 | Homer | Sept. 10, 1935 |